United States Patent [19]

Woodhall et al.

[11] Patent Number: 5,362,786

[45] Date of Patent: * Nov. 8, 1994

[54] PROTECTIVE COATING AND METHOD OF USING SUCH COATING

[75] Inventors: Edward W. Woodhall, Los Altos; Nicholas Kondrats, Goleta, both of Calif.

[73] Assignee: Cal-West Equipment Co., Inc., Los Altos, Calif.

[*] Notice: The portion of the term of this patent subsequent to Feb. 16, 2010 has been disclaimed.

[21] Appl. No.: 16,872

[22] Filed: Feb. 11, 1993

Related U.S. Application Data

[63] Continuation of Ser. No. 972,037, Nov. 5, 1992, Pat. No. 5,302,413, which is a continuation-in-part of Ser. No. 614,330, Nov. 16, 1990, abandoned.

[51] Int. Cl.$^5$ ............................................. C08K 5/54
[52] U.S. Cl. ................................. 524/267; 524/261; 524/379; 524/389
[58] Field of Search ................ 524/379, 389, 267, 261

[56] References Cited

U.S. PATENT DOCUMENTS

| | | |
|---|---|---|
| 2,020,256 | 11/1935 | Copeman . |
| 2,082,791 | 6/1937 | Copeman . |
| 2,372,982 | 4/1945 | Richards et al. . |
| 2,420,720 | 5/1947 | Pechukas et al. . |
| 2,603,574 | 7/1952 | Holmes . |
| 3,114,650 | 12/1963 | Oppenheim et al. . |
| 3,201,274 | 8/1965 | Hobbs, Jr. . |
| 3,202,554 | 8/1965 | Hornus . |
| 3,423,225 | 1/1969 | Coney et al. . |
| 3,492,258 | 1/1970 | Kremer . |
| 3,620,796 | 11/1971 | Gordy . |
| 3,696,498 | 10/1972 | Leontaritis et al. . |
| 4,055,441 | 10/1977 | Taylor et al. . |
| 4,145,855 | 3/1979 | Sheldon . |
| 4,169,088 | 9/1979 | Hansen . |
| 4,199,620 | 4/1980 | Edwards et al. . |
| 4,200,671 | 4/1980 | Krajewski et al. . |
| 4,287,103 | 9/1981 | Francis et al. . |
| 4,456,731 | 6/1984 | Caporossi et al. . |
| 4,582,761 | 4/1986 | Liu .................................. 524/379 |
| 4,592,756 | 6/1986 | Kawasaki et al. . |
| 4,612,058 | 9/1986 | Geke et al. . |
| 4,634,607 | 1/1987 | Ernsberger . |
| 4,748,049 | 5/1988 | Charles et al. . |
| 4,759,959 | 7/1988 | Guy . |
| 4,792,464 | 12/1988 | Martenson . |
| 4,844,833 | 7/1989 | Komatsu et al. . |
| 4,956,404 | 9/1990 | Pelzig .............................. 524/563 X |
| 5,028,350 | 7/1991 | Marsek ............................ 252/88 |
| 5,093,401 | 3/1992 | Claussen et al. ................. 524/379 |
| 5,104,711 | 4/1992 | Marsek ............................ 428/78 |
| 5,143,949 | 9/1992 | Grogan et al. .................. 524/388 X |
| 5,151,461 | 9/1992 | Perrington et al. ............. 524/389 X |
| 5,186,978 | 2/1993 | Woodhall et al. .............. 525/379 |
| 5,201,946 | 4/1993 | Marsek ............................ 106/208 |

FOREIGN PATENT DOCUMENTS

| | | |
|---|---|---|
| 454888 | 3/1949 | Canada . |
| 58-80301 | 5/1983 | Japan . |
| 185634 | 10/1963 | Sweden . |
| 2191717 | 12/1987 | United Kingdom . |

OTHER PUBLICATIONS

"Masker-Aide Technical Bulletin", Mar., 1993.
"Masker-Aide" Material Safety Data Sheet, Mar. 17, 1993.
"Partall® Mold Release Agents Film #10 Paste #2" Product Bulletin.
"Magic Mask" Analysis.
"Slime" product label and formulation data.
"Partall Film #10" Material Safety Data Sheet.
"Clean Strip" report.
"Fluorad" Technical Brochure.
"Zonyl" Technical Brochure.

*Primary Examiner*—Judy M. Reddick
*Attorney, Agent, or Firm*—Townsend and Townsend Khourie and Crew

[57] ABSTRACT

A vehicle masking material and method of use. The masking material in one embodiment includes polyvinyl alcohol, ethyl alcohol, glycerine or triethylene glycol, a surfactant, and water. The masking material is applied to a surface which is to be protected from paint overspray or other mechanical process, allowed to dry, and paint is applied. After drying of the paint, the masking material is removed by peeling or water washing.

1 Claim, No Drawings

PROTECTIVE COATING AND METHOD OF USING SUCH COATING

CROSS REFERENCE TO RELATED APPLICATIONS

This application is a continuation of U.S. application Ser. No. 07/972,037, filed on Nov. 05, 1992 and now U.S. Pat. No. 5,302,413 which is a continuation-in-part of U.S. application Ser. No. 07/614,330 filed on Nov. 16, 1990 and now abandoned which is incorporated herein by reference for all purposes.

BACKGROUND OF THE INVENTION

The present invention relates to the field of protective coatings to be used during mechanical processing operations of vehicles or buildings. More specifically, in one embodiment the invention provides an improved method and composition for masking selected portions of a vehicle from paint.

It is well known that painting operations often require masking of certain portions of the vehicle or building to prevent overspray. For example, it is often necessary to mask trim and windows on a vehicle from paint overspray. Also, building stucco must frequently be protected from paint or primer coats. On occasion, it is necessary to mask painted portions of a vehicle or building from paints of a different color and overspray of paints of the same color. It is also well known that many surfaces are susceptible to marring and scratching during mechanical processing operations on proximate surfaces. For example, welding and grinding can have deleterious effects on surrounding surfaces.

In practice, masking operations are often one of the most time consuming and, therefore, expensive parts of the painting process. In spite of attempts to develop suitable chemical masks for vehicle painting, vehicle painters continue to use primarily masking tape and paper to cover portions of a vehicle where paint is not desired. To mask the trim on a car, for example, will often require many hours of tedious labor. Furthermore, even when done carefully, defects in such paint masks allow paint to contact surfaces which are desired to be protected.

Solutions have been proposed to the problem of protecting surfaces during mechanical processing operations. However, such techniques have often not found extensive use. Some of the proposed chemical masks have been unsuitable for application to portions of a vehicle or building because of damage which would potentially occur to the protected portions of the vehicle or building. Other compositions are not water soluble. This causes particular problems because environmental controls of solvents are becoming stricter with time. Other compositions are difficult to apply, difficult to remove, excessively costly, or the like.

From the above it is seen that an improved masking composition is needed.

SUMMARY OF THE INVENTION

An improved masking composition and method is provided by virtue of the present invention. The method includes the steps of applying a substantially continuous film of a masking material on a vehicle, building, or other work surface to be protected during a "mechanical processing operation". Such operations include, for example, painting, grinding, welding, and etching. These steps may be performed, for example, during an assembly line production of a vehicle. By "building" it is intended to mean herein a house, warehouse, apartment, garage, store, or the like. By "vehicle" it is intended to mean herein a car, boat, plane, train, railroad car, or the like. By "substantially continuous film" it is intended to mean herein a film lacking pinholes through which paint or other materials generated during mechanical processing could reach an underlying surface. The masking material is, in one specific embodiment, a composition of water, an aliphatic polyol, alcohol, and a surfactant. In a different embodiment the masking material includes water, a plasticizer (such as glycerine, triethylene glycol or polyethylene glycol), an aliphatic polyol, alcohol and surfactant. The masking material will dry quickly, and be readily removable with water after use. Further, the material is relatively harmless from an environmental point of view.

A further understanding of the nature and advantages of the inventions herein may be realized by reference to the remaining portions of the specification.

DESCRIPTION OF THE PREFERRED EMBODIMENTS

The present invention provides an improved method and composition for protecting a vehicle or other work surface to be painted or mechanically processed. For example, certain regions of an automobile may be masked in accordance with the present invention to protect those regions from paint overspray in a painting booth. The method and composition produces a film which adheres well to a surface to be protected, with few or no pinholes. Further, the material can be removed easily from the surface to be protected after use with a water wash, or by peeling, or by combinations of the two.

More generally, the present invention provides an improved method and composition for protecting selected surfaces during selected mechanical processing operations such as welding or grinding, as well as painting. The adherent film of the present invention protects the selected surface from marring, scratching or other deleterious effects associated with mechanical processing. The mechanical processing steps might be encountered, for example, during assembly or repair of vehicles, or during construction or renovation of buildings. The present invention can be employed with particular advantage during fabrication of vehicles or other products on an assembly line. An assembly line production typically employs a series of steps including, for example, grinding, welding, and painting. Each of these operations can advantageously employ the masking composition and method of the present invention.

One embodiment includes water, an aliphatic polyol, alcohol, and a surfactant. According to preferred embodiments, the composition includes at least about 1% polyvinyl alcohol by weight. Preferred compositions include between 1 and 30% aliphatic polyol such as polyvinyl alcohol, with most preferred compositions of about 5 to 20% polyvinyl alcohol, and one specific embodiment including about 8% polyvinyl alcohol. The aliphatic polyol component may include two different polyols having different molecular weight ranges. For example, DuPont Corporation's Elvanol 5105 (15,000 to 27,000 daltons) and Elvanol 5042 (70,000 to 100,000 daltons) can be used together in some formulations.

For some applications, it will be necessary to provide a "thicker" or more viscous protecting material formulation. For instance, in painting train boxcars, a thicker formulation is desirable for protecting the wheels and couplings from overspray. The wheels and couplings of boxcars must be periodically inspected for cracks by techniques which are well known in the art. To avoid obscuring these cracks, the protecting material should be thick enough that it does not penetrate any existing cracks. For such applications, the protecting material formulation may be made thicker by a variety of means which are well known in the art. For example, the concentration of a high molecular weight polyvinyl alcohol can be increased. Preferably, the masking material will have a viscosity of about 50 to 1000 centipoise, and preferably about 200 centipoise.

It has been found that for general purposes a superior masking material includes water, an aliphatic polyol (preferably a partially hydrolyzed polyvinyl alcohol having a molecular weight from about 15,000 to about 100,000), a plasticizer, alcohol, and a surfactant. According to preferred embodiments, the composition includes at least about 0.1% by weight of a plasticizer such as glycerine. Preferred compositions include between 0.5 and 7% glycerine, and one specific embodiment including about 1% glycerine.

An alternative preferred embodiment includes water, triethylene glycol, an aliphatic polyol, alcohol surfactants. According to this embodiment, the composition includes as a plasticizer at least about 0.1% by weight triethylene glycol. More preferably, the triethylene glycol content ranges from 0.5% to 5%, and in one specific embodiment includes about 2% triethylene glycol. For some applications, a polyethylene glycol having a molecular weight of between about 100 and 1,000 may be substituted as a plasticizer for the triethylene glycol.

The masking material will include a lower molecular weight alcohol. Preferred alcohols for the composition include methyl alcohol, ethyl alcohol, and 2-propyl alcohol. A most preferred alcohol is ethyl alcohol. For many applications, the percentage of alcohol utilized is preferably less than about 25% by weight (based on 190-proof alcohol), with compositions having less than 20% alcohol most preferred. When ethyl alcohol is utilized, most preferred compositions include between 10 to 20% alcohol with about 10 to 15% preferred, and 12 to 13% most preferred. However, when thicker formulations are desired, a higher concentration of alcohol may be used to speed the drying process. Up to about 40% alcohol can be used for some applications. When methyl or propyl (such as isopropyl or 2-propyl) alcohol is utilized as a denaturant, compositions with less than 1.0% by weight denaturant alcohol are preferred, and compositions of between 0.5 and 1.0% are most preferred.

The masking material also includes a surfactant. The surfactant is, in one embodiment, a nonionic biodegradable surfactant such as an acetylenic diol. In preferred embodiments, the invention includes an alkyl aryl surfactant (such as Triton CF-10 and CF-12), a polyethoxy adduct, or a modified (poly) ethoxylate (such as Triton DF-12 and DF-16). Other surfactants include nonylphenoxypolyethanol (such as IGEPAL CO-660 made by GAF), polyoxyalkylene glycol (such as Macol 18 and 19 made by Mazer Chemicals), acetylenic diol-based surfactants (such as Surfynol 104A made by Air Products), and the like. Preferred compositions include up to 10% surfactant. Most preferred compositions include less than 5% by weight surfactant and more preferably less than 1% surfactant, with one specific implementation including about 0.3% surfactant.

The mask also includes a substantial amount of water, such as deionized water having a resistivity of about 18 megaohm-cm. In one embodiment of the invention, the balance of the mask is composed of water, although a variety of other materials may also be included such as dyes, odorants, and the like.

Antistatic compounds are added in preferred embodiments to reduce static build-up. This prevents static from being drawn to the vehicle in question. Antistatics (such as Lowstat HTS-905 made by Mazer Chemicals) are provided in some embodiments, preferably water soluble. Sequesterants are also added in some embodiments (less than 1%) such as citric acid for a pH of 5–6, glycolic, sodium citrate or the like. Sequesterants will reduce spotting.

The masking material is made by conventional means, typically including the steps of gently mixing the components of the masking material at substantially atmospheric pressure, so as to form a substantially homogeneous mixture. The components are preferably heated during mixing such as from 180° F. to 200° F., excluding the alcohols, which are added after mixing the remaining components.

The masking material is applied by one of a variety of techniques. Preferred techniques include brushing and spraying of the material. In one preferred embodiment the surface to be protected is blown dry of dust and debris. In some cases, additional water may be added for easier application, such as a 10% dilution. Thereafter, the masking material is applied with a pressure pot sprayer, preferably first in a thin mist and, thereafter, in a flow coat or thicker substantially continuous film. For some applications, the mist coat will not be necessary. The mask material is sprayed primarily on the surface to be protected, although overspray will not pose significant problems since any overspray may be readily removed with, for example, a wet towel or sponge. In preferred embodiments, the resulting masking coating is from about 0.5 to 4 mils thick, preferably about 1.5 to 2.5 mils thick, with a preferred thickness of about 2 mils.

The masking material is then permitted to dry, normally at atmospheric temperatures and pressures. Such drying will take about 10 to 30 minutes in typical applications (at room temperature and 30% humidity). Significantly longer drying times are needed at 50° F. For such lower temperatures, additional ethanol may be provided in a separate container to increase the ethanol content by about 10% by weight. The surface is then painted or otherwise mechanically processed without fear of overspray on the portions of the surface protected by the masking material. Baking (at, e.g., 130° F.) may be desirable in some embodiments.

If the processing operation includes painting, the paint is first allowed to thoroughly dry. Such drying times will vary radically depending upon the particular type of paint utilized. After drying of the paint, the masking material is removed from the protected surface. Such removal operations may include, for example, peeling of the material off of the protected surface. In alternative embodiments the mask is removed by normal washing with water, but pressure washing with water may be desired in some instances. The material will be removed readily since it is easily miscible or soluble in water.

EXAMPLES

The following examples are offered as illustrations of the invention:

1. Alcohol Content

Four samples of masking material were made including 6 to 9% polyvinyl alcohol, about 0.3% surfactant, and water. Varying amounts and types of alcohols were utilized. Alcohols included ethanol, isopropanol, and methanol. Automotive surfaces were masked with the materials. The tests showed that while higher percentages of alcohol produced faster drying mask materials and better layout of the materials, automotive paints were adversely effected, resulting in dulling of the paint. Isopropyl and methyl alcohols were found to have the most deleterious impact on automotive paint. Ethyl alcohol contents of from 10 to 20% did not result in paint damage, while having suitable drying times (about 30 minutes, with the higher alcohol content samples having shorter drying times), and solids dispersion properties. Using methyl and propyl alcohol as denaturants, it was necessary to maintain the denaturant alcohol content below 1% of the total masking finished product to reduce paint damage to an acceptable level. Lower alcohol content may also be desirable to ensure a higher flash point material.

2. Surfactant

Base samples with 8% polyvinyl alcohol and ethyl alcohol contents ranging from 10 to 25% were prepared. Multiple surfactants were used including acetylenic diol-based surfactants (such as TG and PC made by Air Products), polyoxyalkylene glycol-based surfactant (Macol 18 and 19 made by Mazer Chemicals), nonylphenoxypolyethanol-based surfactant, and polysiloxane. 0.3% surfactant was utilized. Acetylenic diol-based compounds produced satisfactory results (i.e., no spotting or dulling). Polyoxyalkylene glycol-based materials produced the best results, but suffered from foaming during application. Glycol-based compounds laid out the best overall.

3. Scents

Samples were tested to determine if an odorant would be needed to overcome effects of the high alcohol content. It was found that scent did not appreciably improve the odor of the material when alcohol content was maintained below 20% and that the material had a pleasant smell.

4. Defoamers

Samples were tested with various defoamers. Samples were tested with polysiloxane (XFB41-58 made by Air Products), acetylenic glycol (Surfynol 64A made by Air Products), and oil-based defoamers in an amount of less than 1%, and preferably 0.05%. Polysiloxane and acetylenic glycol produced satisfactory masking material. Oil-based defoamers left an oily residue on protected surfaces. Acetylenic glycol defoamer was preferred.

5. Film Prevention

In order to reduce residual films left by the masking materials, additional surfactants were tested. Alkyl aryl-based surfactants (Triton CF-10 and CF-12 or Perform Plus), polyethoxy adduct-based surfactants, and modified ethoxylate-based surfactants (such as Triton DF-12 and DF-16) were tested for residual film prevention. Polyethoxy adduct-based surfactants and modified ethoxylate-based surfactants provided reduced film retention. Particularly good results were obtained using Fluorad 171 and Fluorad 430 (both made by 3M Company) in conjunction with Triton DF-16.

According to a preferred embodiment, the masking material included the following components presented in a per weight basis:

Deionized water (Megaohm-cm) 79%
PVA, partially hydrolyzed solids, (typically 87%–89% hydrolyzed)
Ethyl alcohol 12.5% (including methanol; 3–6%; isopropyl of the ethanol and 1–3% of the ethanol isopropyl)
Surfactant, Perform Plus, 0.3%
Antistatic, less than 0.5%
Defoamer, less than 1%

According to a different preferred embodiment, the masking material included the following components presented in a per weight basis:

Deionized water (18 ppm) 77.1%
Triethylene glycol 2.0%
Denatured ethyl alcohol 12.5%
Surfactant 0.25%
Polyvinyl alcohol (Elvanol 5042 (Dupont Corp.) 1.0% and Elvanol 5105 (Dupont Corp.) 7.0% )

According to a most preferred embodiment, the masking material included the following components:

Deionized Water (18 ppm) 78.1%
Glycerine 1.0%
Denatured Ethyl Alcohol 12.0%
Surfactant 0.25%
Polyvinyl Alcohol (Elvanol 5042 (Dupont Corp.) 1% and Elvanol 5105 (Dupont Corp.) 7%)

A thicker masking material included the following components presented in a per weight basis, especially for use in train masking operations and the like:

Deionized Water 49.71%
Denatured Ethyl Alcohol (190 proof) 35.00%
Glycerine 5.00%
Polyvinyl Alcohol (Elvanol 5042 (DuPont Corp.) 2.66% and Elvanol 5105 (DuPont Corp.) 7.33%)
Surfactant 0.25% (Triton DF-16 0.20%, 3M FC 171 0.03%, and 3MFC 430 0.02%)
Yellow Dye 0.05%

The above description is illustrative and not restrictive. Many variations of the invention will become apparent to those of skill in the art upon review of this disclosure. Merely by way of example, while the invention is illustrated with regards to particular brands of materials used in the mask, the invention is not so limited. The scope of the invention should, therefore, be determined not with reference to the above description, but instead should be determined with reference to the appended claims along with their full scope of equivalents.

What is claimed is:

1. A composition comprising
   a) greater than 5% polyvinyl alcohol by weight;
   b) less than 20% ethyl alcohol by weight, based on 190-proof ethyl alcohol;
   c) less than about 1% of a surfactant by weight;
   d) less than about 1% of a denaturant by weight;
   e) less than about 1% of a polysiloxane defoamer by weight; and
   f) water, with the proviso that each of components (b), (c), (d) and (e) are present.

* * * * *